United States Patent [19]

Corner

[11] Patent Number: 5,989,460
[45] Date of Patent: Nov. 23, 1999

[54] ELECTRICALLY CONDUCTIVE COATING

[75] Inventor: William A. Corner, North Olmsted, Ohio

[73] Assignee: Garland Floor Co., Cleveland, Ohio

[21] Appl. No.: 08/819,022

[22] Filed: Mar. 17, 1997

Related U.S. Application Data

[63] Continuation of application No. 08/342,768, Nov. 21, 1994, abandoned.

[51] Int. Cl.$^6$ .............................. H01B 1/02; B32B 5/16; C09D 1/00
[52] U.S. Cl. ........................ 252/513; 428/328; 428/329; 428/331; 428/339; 428/402; 428/425.8; 428/425.9; 428/924; 428/925; 428/931; 106/1.12; 106/1.27; 106/286.3; 106/287.1; 106/482; 106/567; 106/643; 106/816
[58] Field of Search ............................ 252/513; 428/328, 428/331, 339, 402, 329, 425.8, 425.9, 931, 924, 925; 106/1.12, 1.27, 643, 567, 816, 287.1, 286.3, 482

[56] References Cited

U.S. PATENT DOCUMENTS

| | | | |
|---|---|---|---|
| 2,351,022 | 6/1944 | Domelson et al. | 106/106 |
| 3,562,124 | 2/1971 | Leon et al. | 106/84 X |
| 4,119,763 | 10/1978 | Blair | 428/328 X |
| 4,284,072 | 8/1981 | McKaveney | 126/901 |
| 4,301,046 | 11/1981 | Berbeco | 252/511 |
| 4,308,568 | 12/1981 | Whewell | 252/511 X |
| 4,360,384 | 11/1982 | McKaveney et al. | 106/1.12 |
| 4,390,458 | 6/1983 | McKavaney | 252/513 X |
| 4,447,492 | 5/1984 | McKaveney | 252/500 X |
| 4,517,118 | 5/1985 | Stoetzer | 252/513 |
| 4,518,524 | 5/1985 | Stoetzer | 252/513 X |
| 4,540,438 | 9/1985 | Gutmann et al. | 106/97 |
| 4,596,668 | 6/1986 | Berbeco | 252/500 |
| 4,719,038 | 1/1988 | Sobata et al. | 252/513 X |
| 4,770,916 | 9/1988 | Leukel et al. | 428/40 X |
| 4,818,437 | 4/1989 | Wiley | 252/511 |
| 4,818,438 | 4/1989 | Wiley | 252/511 |
| 4,828,614 | 5/1989 | Miller et al. | 252/513 X |
| 4,872,910 | 10/1989 | Eshleman et al. | 106/3 |
| 4,889,750 | 12/1989 | Wiley | 428/34.2 |
| 5,276,080 | 1/1994 | Oku | 252/518 X |
| 5,284,705 | 2/1994 | Cahill | 252/518 X |
| 5,307,233 | 4/1994 | Forry | 428/327 X |

FOREIGN PATENT DOCUMENTS

| | | |
|---|---|---|
| 525627 | 5/1956 | Canada . |
| 702349 | 1/1965 | Canada . |
| 251645 | 1/1988 | European Pat. Off. . |
| 55100215 | 7/1980 | Japan . |
| 5716416 | 4/1981 | Japan . |
| 1285257 | 12/1986 | Japan . |
| 1204937 | 8/1989 | Japan . |
| 2038355 | 2/1990 | Japan . |

OTHER PUBLICATIONS

McKaveney, J.P., "Synergism between Chemistry and Metallurgy for Invention", Journal of Metals, 39(3), 42–45, Mar. 1987.

CRC Handbook of Chemistry and Physics, Weast, Robert C., ed., 63rd ed., 1982, p. F–122.

Primary Examiner—Yogendra Gupta
Assistant Examiner—Brian P. Mruk
Attorney, Agent, or Firm—Watts, Hoffmann, Fisher & Heinke Co., L.P.A.

[57] ABSTRACT

An electrically conductive floor coating comprising a ferroalloy containing layer including particles of ferroalloy interspersed with a resinous binder.

13 Claims, No Drawings

ELECTRICALLY CONDUCTIVE COATING

This is a continuation of application Ser. No. 08/342,768, filed on Nov. 21, 1994 now abandoned.

BACKGROUND OF THE INVENTION

Electrical conductivity in a flooring system is desirable to minimize the potential for generating and/or maintaining an electrostatic charge on the floor. The ability of a floor to generate an electrostatic charge is referred to as tribocharging. The ability of the human body to tribocharge by movement across a floor has been further defined as Body Voltage Generation (BVG). It is generally desirable to minimize the ability of floors to tribocharge. In some environments it can be critical because electrostatic charges as low as 50 volts can damage sensitive equipment.

Body Voltage Generation occurs on antistatic flooring as well as insulative flooring. The function of an antistatic floor coating is to minimize the ability of the floor to tribocharge and to bleed off any charge that is created as quickly as possible. The type of fillers used determine the ability of a floor coating to control BVG and to bleed off any charges generated. Currently, the two principal types of antistatic coating systems are particulate systems and fiber systems. Particulate floor coating systems are highly loaded with conductive particles. As a result, they utilize the entire coating surface to conduct away the electric charge. These systems do a good job of limiting BVG, typically permitting less than 15 volts of BVG to be generated. In addition, particulate systems bleed off the charge almost instantaneously. Fiber systems are generally less effective than particulate systems because they employ oriented conductive fibers, thereby limiting the amount of points that will conduct the electrical charge away. Fiber systems can generate in excess of 100 volts of BVG. Not only do these systems allow higher BVG to generate, they also take longer to bleed off the charge. Under low humidity, fiber based coating systems may never bleed off the charge entirely.

Both of the foregoing systems have their limitations. Particulate systems are easy to install but are expensive, making their use in thick coatings cost prohibitive. Fiber systems are inexpensive but difficult to install. The fibers must be aligned perpendicular to the surface and, if misaligned, the antistatic floor will not function properly. In addition, the current coatings are frequently not durable enough for manufacturing environments and are subject to loss of adhesion to the substrate. The loss of adhesion is caused by moisture vapor transmission through the concrete of the floor to the interface of the concrete and coating. Typically, only thick troweled systems have the ability to withstand this moisture at the interface because of greater surface preparation and increased bond and peel strength. Since cost typically limits the thickness of particulate systems, they can rarely be employed at thicknesses necessary to eliminate the problem of adhesion loss caused by moisture vapor transmission. Still further, the conductive fillers typically used in both fiber and particulate systems tend to make the coatings softer with less cohesive strength. The products currently available have raw material costs that make the installation of thick coatings, for example in excess of 90 mils, cost prohibitive.

There has been a need for antistatic coating systems that are more durable in manufacturing environments, can be applied in greater thicknesses and that resist moisture vapor transmission. An antistatic coating combining the conductive performance and ease of installation of a particulate system, with the lower cost of a fiber system, but which does not exhibit the drawbacks of either, is needed in the industry.

DISCLOSURE OF THE INVENTION

It has been discovered that ferroalloys, in particular ferrosilicon, can be used to prepare superior antistatic coatings for floors. The inventive coatings offer the ease of installation and conductive performance of expensive particulate systems at the cost of inexpensive fiber systems. They are more versatile and durable than existing coatings, and can be economically prepared in thick films. Ferrosilicon is inexpensive and extremely durable. It has been discovered that the addition of ferrosilicon to an antistatic coating significantly increases the abrasion resistance and impact strength of the coating. The abrasion resistance of a typical epoxy coating filled with carbon or antimony-tin-oxide will generally be greater than 60 milligrams weight loss per 1000 cycles with CS-17 wheels and 1000 gram loads. By contrast, the abrasion resistance of the inventive ferrosilicon containing epoxy systems is typically less than 50 milligrams weight loss. Improvements in abrasion resistance of 10 to 20% have been achieved with the inventive coatings using other polymer systems as well. Compressive strength is also improved. This is particularly notable in thicker coatings. The compressive strength of a typical thick film epoxy coating is 8,000 to 10,000 psi at 73° F. using the ASTM C-579-A test. By contrast, the compressive strength of thick film epoxy coatings according to the invention typically ranges from 10,000 to 12,000 psi at 73° F. The ferrosilicon containing films of the invention typically exhibit a 10 to 20% increase in impact resistance over comparable epoxy systems that do not include ferrosilicon.

The testing of surface resistance is typically done in accordance with the ESD Association S7.1-1994 Standard—"Floor Materials—Resistive Characterization of Materials." This test measures point-to-point and point-to-ground conductivity in terms of resistance. Point-to-point conductivity is the measure of the resistance between two points on the surface of the coating and is determined using 5 pound electrodes, described in detail in the Standard, placed at three foot intervals. Point-to-ground conductivity is the measure of the resistance between a point on the surface of the coating and a verified ground. It is measured by placing one electrode on the floor and attaching the other lead to a verified groundable point at a specified distance from the first electrode. A testing voltage is then applied to the electrodes according to the S7.1 test specifications and the resistance exhibited by the coating measured. Other specifications for the testing of surface resistance of ESD (Electrostatic Discharge) floors are also currently used. These include the NFPA (National Fire Protection Association) Test Method 99, set forth in the 1987 Edition of Reduction in Electrostatic Hazard, and the ASTM F150-89 Standard Test Method for Electrical Resistance of Conductive Resilient Flooring. As used herein, a conductive coating exhibits a point-to-point resistance of between about 25,000 and $1\times10^6$ ohms, a static dissipative coating exhibits a point-to-point resistance of between about $1\times10^6$ and $1\times10^9$ ohms, and an insulative coating exhibits a point-to-point resistance in excess of about $1\times10^9$ ohms according to the ESD S7.1 method.

The ferrosilicon coatings of the preferred embodiment, when installed on a non-conductive substrate such as concrete, non-conductive polymer, glass and the like, are insulative. In other words, the point-to-point and point-to-ground resistance of the ferroalloy containing layer by itself in the absence of a conductive primer is greater than $1\times10^9$.

It has been discovered that when an insulative ferrosilicon containing coating according to the preferred embodiment is applied over a conductive substrate or primer, the system then exhibits the resistance of the underlying substrate or primer. It has also been discovered that when at least two different size grades of the ferrosilicon are used, the coating will both enable the electrical charge to reach the conductive primer and exhibit improved mechanical properties. Advantageously, this also minimizes BVG. The inventive coatings can be applied directly to a concrete floor without the need for insulative primer coats or external grounding points since the concrete itself can act as a static dissipative ground. Moreover, the conductivity exhibited by these coatings can be readily selected to any desired value without sacrificing durability because the ferroalloy containing layer will exhibit the conductivity of its underlying conductive primer. By changing the conductive primer, one can change the conductivity of the system without sacrificing the advantageous characteristics of the topcoat. Ferroalloy containing coatings of the invention have increased hardness, cohesive strength and wear resistance. The reduced cost of the troweled systems enable the installation of coatings that are less susceptible to moisture vapor transmission. Advantageously, the inventive coatings can reduce manufactured costs to a point where thicker systems having electrical performance comparable to particulate systems are affordable.

Accordingly, in one embodiment the invention provides an electrically conductive coating comprising a ferroalloy containing layer including particles of ferroalloy interspersed with a resinous binder. The ferroalloy particles have an average particle size greater than about 20 micrometers and are present in an amount that produces a point-to-point resistance in said ferroalloy in excess of about $1 \times 10^9$ ohms. Preferably, the ferroalloy is ferrosilicon present in first and second portions, the first portion of ferroalloy having an average particle size that is greater than said second portion of ferroalloy. Still more preferably, the second portion of particles has an average particle size of from about 20 to about 300 microns. In one embodiment, the coating includes an disposed directly under said ferroalloy containing layer.

In another embodiment, the ferroalloy containing layer further includes a portion of secondary electrically conductive filler particles in an amount sufficient to render said ferroalloy containing layer point-to-point conductive, the secondary filler particles being a different material than said ferroalloy.

In a further embodiment there is provided an electrically conductive coating comprising a ferroalloy containing layer including first and second portions of ferroalloy particles interspersed with a resinous binder, the first portion of ferroalloy having an average particle size that is greater than the second portion of ferroalloy. Preferably, the ferroalloy is ferrosilicon and said second portion of particles has an average particle size of from about 20 to about 300 micrometers. In one embodiment, this coating includes an electrically conductive layer disposed directly under said ferroalloy containing layer. In another embodiment, the ferroalloy particles of this coating are present in an amount that produces a point to-point resistance in said ferroalloy in excess of about $1 \times 10^9$ ohms and the coating includes an electrically conductive layer disposed directly under said ferroalloy containing layer. In still another embodiment, this ferroalloy containing layer further includes a portion of secondary conductive filler particles in an amount sufficient to render said ferroalloy containing layer point-to-point conductive, the secondary filler particles being a different material than said ferroalloy particles. Preferably, the ratio of said first portion of particles to said second portion of particles is from about 1:1 to about 3:1.

Conductive ferro-containing materials, or ferroalloys, are commercially available. The preferred ferrosilicons of the invention are available from Washington Mills, North Grafton, Mass. The actual composition of the conductive filler in the ferroalloy containing layer will partially depend upon the desired characteristics of the coating, such as conductivity, appearance and durability. For example, although the preferred coatings cooperate with a conductive primer, it may sometimes be desirable to prepare a stand alone coating that does not require a conductive primer. To this end, the filler can include other conductive particles in addition to the ferroalloy, such as antimony-tin-oxide, in an amount sufficient to render the coating point-to-point conductive by itself, without a conductive primer.

The final performance properties desired for the floor, such as chemical resistance, BVG, color and the like, also dictate the selection of a binder for use in the present coatings. For example, chemical resistance is best served by utilizing novolac epoxy systems, vinyl esters or polyesters. If U.V. and stain resistance is desired, one might select an aliphatic polyester urethane. If neither chemical nor U.V. resistance are especially critical, one might select an aromatic urethane or a general purpose epoxy for general chemical resistance and durability. When an epoxy is used, the activator (curing agent) will dictate the final film properties. For example, cycloaliphatic amines yield excellent chemical resistance whereas polyamides yield slightly less chemical resistance but are less expensive.

The selection of binder also effects the amount of BVG. When appropriate ESD type footware is utilized, the binders should all exhibit similar BVG characteristics. However, when non-ESD type footware is used, such as tennis shoes and workboots, binder selection can be important. It has been discovered, for example, that urethanes generate lower BVG when non-ESD type footware is used. This is because of the position on the Triboelectric Series chart of the typical materials used in the soles relative to the location of urethane on the chart. Any polymer used as a binder will either increase or decrease the BVG depending upon its position on the Triboelectric chart in comparison with the location of the materials used in the footwear.

It will be apparent to those of ordinary skill in the art that the selection of suitable conductive fillers, binders and other additives, and their relative amounts, is subject to some variation depending upon the desired properties for the final coating. In as far as the desired properties for a specific application will vary, the selection of suitable binders, fillers and additives for a particular purpose would be known to those of ordinary skill in the art in view of the instant disclosure.

The nature of the conductive primer is not critical as long as it exhibits the desired conductivity and is chemically compatible with the ferroalloy containing layer with which it is intended to be used.

Many additional features, advantages and a fuller understanding of the invention will be had from the following detailed description of the preferred embodiments and the examples contained therein.

DETAILED DESCRIPTION OF THE PREFERRED EMBODIMENTS

In accordance with the preferred embodiments there is provided a coating system having a ferroalloy containing layer. Advantageously, the ferroalloy containing layer can be prepared in films as thick as 90 mils wet film thickness, and in troweled coatings as thick as 300 mils wet film thickness. The ferroalloy containing layers are preferably coated directly onto an electrically conductive primer layer. In the preferred systems the ferroalloy is interspersed in the ferroalloy containing layer in an amount that does not render the coating point-to-point conductive without a conductive primer. This helps to provide good mechanical properties. Instead the conductive primer is responsible for the pointopoint conductivity of the coating system. In addition, the preferred ferroalloy containing layers include at least two distinct size grades of conductive particles. Still more preferably, both the larger and the smaller particles are ferroalloy. In another preferred embodiment these coatings can be formulated as stand alone systems, in which the ferroalloy containing layers are doped with secondary conductive filler particles in an amount sufficient to render the coatings point-to-point conductive by themselves, without a conductive primer.

The conductive primer for use in the foregoing systems consists of a resinous binder and conductive filler. The binder is preferably a thermosetting polymer selected from polyurethanes, epoxies, polyesters or vinyl esters. Preferred general purpose epoxies include bisphenol-A diglycidyl ethers, such as Ciba-Geigy 6010 or Epon 828 from Shell, and epoxy novolacs, such as CL Industries 8230, CL Industries 8250, and Ciba-Geigy EPN 1138. Preferred vinyl esters include Derakane 470-36 and Derakane 411-45 available from Dow Chemicals. Preferred polyesters include Bia-A-Fumerate available from Dow Chemicals, and Atlac 382E available form ICI. Suitable polyols include, for example, Tone 301 polyol from Union Carbide, aliphatic isocyanates such hexamethylene diisocyanate available from Miles Inc., under the tradename Desmodur N-75, polyester polyols such as R-221-75 and Desmophen 651A-65 both from Miles Inc., polyether polyols such as Desmophen 1920D and Desmophen 550U from Miles Inc., or an aromatic isocyanate such as Mondur MRS-5 from Miles or toluene diisocyanate, also available from Miles under the tradename Desmodur CB-17. Other suitable polymers would be known to those of ordinary skill in the art in view of the instant disclosure.

When an epoxy is used, the activator (curing agent) selected for the epoxy will dictate the final film properties. For example, cycloaliphatic amines, such as Air Products 2368, Ciba-Geigy 2964 and the like, yield excellent chemical resistance. Polyamides, such as Air Products Ancamide 501 or Air Products 503 and the like, yield slightly less chemical resistance but are less expensive.

The selection of the binder system for the conductive primer is also partially dictated by the binder used in the ferroalloy containing layer with which it is intended to be used. Polyester and vinyl ester based ferroalloy containing layers do not adhere well to typical epoxy primers and would require a different binder as would be known to those of ordinary skill in the art. By contrast, urethane based ferroalloy containing layers can be used with either epoxy or urethane based primers.

The selection of binder will to some extent also control the amount of BVG when the coating is used in an environment where non-ESD type footware is worn. Those of ordinary skill in the art will know to select an appropriate binder system for the conductive primer in order to obtain any particularly desired color, mechanical properties, chemical resistance and conductivity.

The electrically conductive fillers for use in the conductive primer are fine powders of conductive particles ranging in size from about 20 $\mu$m to about 150 $\mu$m. The conductive filler particles may be selected from any of those commonly used in the art. For example, suitable conductive fillers include metallic powders such as nickel, gold, silver, graphite, carbon and the like, powders of metal alloys and composites such as ferroalloys, antimony-tin-oxide and the like, and combinations of the foregoing. The preferred conductive fillers are carbon black, graphite or mixtures thereof. The conductive fillers typically comprise from about 1 to about 25% by weight based on the weight of the primer composition. A preferred carbon black is C55 Shawinigan Black 50% Acetylene Carbon Black, commercially available from Chevron. This filler is preferably used in an amount of from about 3 to about 9% by weight based on the weight of the primer composition. A preferred graphite is PC-38, commercially available from UCar. This filler is preferably used in an amount of from about 10 to about 25% by weight based on the weight of the primer composition.

The conductive filler may be incorporated into the resin, the activator or, in some instances, added to the mixed components in the field. The incorporation method and type of filler will determine the overall appearance and cohesive strength of the primer. For example, graphite will produce a flat appearance and lower cohesive strength while carbon black will produce a glossy appearance and higher cohesive strength. Those of ordinary skill in the art would be able to select suitable conductive fillers for the primer in view of the instant disclosure. For example, a primer having a high cohesive strength is necessary for the application of a troweled system. The increased loads and thicker applications over a weaker primer system will tend to cause cohesive failures in the primer, resulting in deterioration of the coating system. Accordingly, one of ordinary skill in the art will know to select a conductive filler such as carbon black or ferrosilicon to impart high cohesive strength to thicker systems.

The conductive primer also includes other additives, such as viscosity adjusters, pigments, extenders, compatibilizers, air release agents, diluents, surfactants and the like, all of which are commonly used in the art to adjust the properties of such coatings. The selection and incorporation of suitable additives necessary to obtain a desired result would be well within the skill in the art in view of this disclosure. By way of example only, one suitable extender/compatibilizer is nonyl phenol, commercially available from Texaco. Furfuryl alcohol may be used as an extender, viscosity reducer and wetting agent and is commercially available from, for example, Quaker Oats. Diluents to reduce viscosity include $C_{12}$–$C_{14}$ alkylglycidyl ethers such as Epoxide 8 commercially available from Shell. Air release agents include emulsions of hydrophobic compounds and paraffin based mineral oils and are commercially available from, for example, Byk Chemie under the tradename BYK-032.

The preferred conductive primers according to the invention are epoxy based and comprise, by weight based on the weight of the composition, from about 30 to about 60% by weight epoxy resin, about 3 to about 9% by weight carbon black or about 10 to about 25% graphite, about 15 to about 30% activator, and about 25 to about 50% miscellaneous additives in the form of stabilizers, compatibilizers, air release agents and the like commonly used in the art. Such a composition is prepared by adding the epoxy to a tank and blending the various additives and conductive fillers over time to form an uncured resin composition. To install the primer the uncured epoxy composition is put into a container large enough to accommodate the addition of the activator.

The activator and epoxy composition are mixed for a few minutes and then applied to the floor to the desired wet film thickness, typically about 5 to 10 mils. The primer is then allowed to cure until a person can walk on the floor, typically 8 to 10 hours at 75° F. Alternatively, the conductive filler can be added to the activator and then mixed and coated to the floor.

The preferred ferroalloy containing coatings for deposition onto the conductive primer are formed from a resinous binder having conductive filler particles interspersed within the binder. At least a portion of the conductive filler particles are ferroalloy particles present in an amount that is insufficient to render the ferroalloy containing layer by itself point-to-point conductive and/or that are present in at least two different size grades.

Ferroalloys, in particular refractory ferroalloys, include ferromanganese, ferromanganese silicon, ferrosilicon, ferromolybdenum, ferrochrome, ferrovanadium, ferrotitanium, ferroboron, ferrophosphorus, ferrotungsten, ferrozirconium and the like. The preferred ferroalloy material for use in the invention is ferrosilicon. The ferroalloy can constitute the entire conductive filler component or only a portion thereof, but is not typically present in an amount sufficient to render the coating point-to-point conductive without a conductive primer since this can adversely effect the consistency and cohesive strength of the film, especially in thicker coatings. Other, secondary, conductive fillers may be combined with the ferroalloy to modify the conductivity of the coating. Suitable secondary conductive fillers include conductive fibers, carbon, carbon blacks, graphite, metallic powders such as nickel, gold or silver, powders of metal alloys or composites such as antimony-tin-oxide and the like, other ferroalloys, or other conductive filler particles commonly used in the art, and combinations of the foregoing. The conductive filler particles, inclusive of the ferroalloy and any secondary conductive fillers, are preferably present in an amount of from about 5 to about 50% by weight based on the weight of the composition.

It has been discovered that in order to provide a coating that enables the charge to be conducted to the primer and, at the same time exhibits superior mechanical properties, the conductive filler component of the ferroalloy containing layer must include at least two different size grades of particles, the larger particles being ferroalloy and constituting a higher percentage of the conductive filler than the finer particles. Still more preferably, the ferroalloy component itself is present in two particle size grades. While not wanting to be bound by theory, it is believed that the larger particles are necessary to impart the advantageous and desirable durability, wear and cohesive characteristics to the coating, but are insufficient to carry the charge to the conductive primer. By contrast, the finer particles are believed to enable the charge to reach the conductive primer, but are insufficient in themselves to impart the superior mechanical properties to the coating. Accordingly, by combining courser ferroalloy particles with finer grades of conductive filler particles one can obtain a synergy resulting in a superior coating system having both good mechanical and conductive properties.

The particle size of the conductive filler particles is to some extent dictated by the film thickness of the ferroalloy containing layer, thicker coatings being able to accommodate a larger range of particle sizes. At thinner film thicknesses, e.g., less than about 90 mils wet film thickness, the conductive filler particles may range from 20 microns to about 12 or 16 mesh. More particularly, the filler particles will typically range from 20 microns to about 250 microns for thinner coatings, and up to about 12 or 16 mesh in thicker troweled coatings. Preferably, the particle size of the ferroalloy ranges from about 20 microns to about 250 microns in thinner coatings, and in troweled coatings will range from about 250 microns to about 16 mesh. When two different ferroalloy particle sizes are used, the larger particles will typically range from about 75 to about 150 microns in thinner systems, and from 150 to about 425 microns in troweled systems in excess of about 90 mils. The finer particles will preferably range from 25 to about 53 microns in the thinner systems and from about 25 to about 90 microns in the troweled systems. Preferably, the ratio of large particles to fine particles is from about 3:1 to about 1:1. Increasing the percentage of the finer grade of filler tends to make the system thicker and harder to install. Conversely, when it is desired to obtain a smooth, high gloss coating, excessively large particles should be avoided since they tend to be visible in the dry film and can leave a textured or matted appearance in thinner coatings.

The preferred ferroalloy for use in the invention is ferrosilicon. Various size grades of ferrosilicon are commercially available from Washington Mills. As noted, the particle size may vary depending upon the coating system. In systems less than about 90 mils one might select Washington Mills Duramet 270D having an average particle size on the order of about 45 microns and Duramet 200 having an average particle size on the order of about 75 microns. In thicker coatings, one might select Washington Mills 16×50 mesh and 60×90 mesh ferrosilicons. Other particle sizes and blends of ferrosilicon can be utilized to obtain variations in the color, mechanical properties and conductive properties of the coatings as would be known to those of ordinary skill in the art in view of this disclosure.

The use of at least two different size grades of ferrosilicon is particularly important in the context of troweled systems. When 50% of the silica sand in a standard epoxy troweled system was replaced with ferrosilicon of a single grade, the system would consistently read a point-to-point resistance at or above the static dissipative range using ESD S7.1, regardless of how much ferrosilicon was added and regardless of the conductivity of the conductive primer. However, by using the preferred blend of 16×50 and 60×90 mesh clean and dry ferrosilicon in a ratio of 2.2:1, consistent results were obtained over a conductive primer.

The conductive fillers can be incorporated into the resin, the activator or, in some instances, added to the mixed components in the field. The incorporation method and type of filler will determine the overall appearance of the coating. The preferred ferrosilicon allows the coating to range in color from light pastels to off-white, while the incorporation of carbon blacks or graphite makes the system dark grey or black.

The preferred binder for the ferroalloy containing layer is a thermosetting polymer selected from polyurethanes, epoxies, polyesters, or vinyl esters as described above for use in the conductive primer. The selection of binder will depend on the nature of the coating desired. For example, polyurethanes can lower BVG when the coating will be used in a non-ESD environment, but they are not readily adapted to use in thicker systems. Accordingly, depending on the environment and use to which the coating will be put, one of ordinary skill in the art will be able to select an appropriate binder for the ferroalloy containing layer.

As with the conductive primer systems, the inventive ferroalloy containing coatings also include the usual additives for thixotropy, leveling, viscosity adjustment, air release, pigments and the like, all as are known in the art for use in such coatings. For purposes of example only, one suitable thixotrope is Bentone 154 from N.L. Industries. A suitable leveling agent and flow adjuster is Anti-Terra-U from Byk Chemie. As in the primer systems, alkylglycidyl ethers, such as Shell Epoxide 8 are useful for adjusting viscosity. Other viscosity adjusters include xylene and glycol ether PM acetate available from Ashland Chemicals. Similarly, BYK-032 from Byk Chemie is a suitable air release agent, and cycloaliphatic amine curing agents such as Ancamine 2368 from Air Products are good activators. CAB 380-01 is a cellulose ester film former for urethanes sold by Eastmann Kodak. Dibutyltin dilaurates, such as Cotin 12 available from Cosan, are accelerators for urethanes. The selection and use of these and other suitable additives common in the industry for such purposes will be known to those of ordinary skill in the art in view of the instant disclosure.

Epoxy based coatings are preferred. When an epoxy system is used, the composition generally requires a finely powdered binder mineral to aid in the dispersion of the ferrosilicon and provide suitable consistency, thixotropy and cohesive strength. Such powdered binder minerals are known in the art and include by way of example, powdered silicas such as silica sand and silica flour, powdered alumina, talc, powdered clays, flint and the like. Again, the selection of the binder mineral will to some degree depend on the thickness of the coating, with thicker troweled systems being able to accommodate and preferably including larger particle sizes. A preferred filler mineral for relatively thin coatings is silica sand such as is commercially available from U.S. Silica under the tradename Snow-Tex 45, which is an anhydrous alumina silica. As the coating gets thicker, approaching 90 mils wet film thickness, a 100 to about 325 mesh silica flour is preferred. Other types and mesh sizes can be utilized depending upon the desired characteristics of the composition as would be known in the art.

In troweled systems having wet film thicknesses in excess of 90 mils, the powdered binder minerals are more important to obtaining satisfactory mechanical film properties due to the increased film thickness of these coatings. The choice of powdered binder mineral depends upon the desired result. For example, the use of aluminum oxide will produce a more durable surface but at a higher cost. In a preferred composition the powdered binder mineral is a blend of 10×20 mesh silica sand and 20×40 mesh silica sand. The blend ratio used for power troweling is 50:50. These thick systems also include a small amount of glass beads as a troweling aid as is known in the art. Other blend ratios and mesh sizes suitable for power or hand trowel systems would be known to those of ordinary skill in the art in view of this disclosure.

Preferred epoxy based ferroalloy containing layers for use with a conductive primer as previously described include, by weight based on the weight of the composition, about 10 to about 45% epoxy, about 15 to about 50% ferrosilicon comprised of first and second portions having different particle sizes in a ratio of larger particles to smaller particles from about 3:1 to about 1:1, activator in an amount ranging from about 10 to about 25%, and from about 20 to about 50% commonly utilized additives for adjusting viscosity, thixotropy, air release agents and the like. Especially preferred epoxy based coatings according to this embodiment will comprise, by weight based on the weight of the composition, about 25 to about 45 % epoxy, about 15 to about 30% ferrosilicon comprised of a first proportion of particles having an average particle size ranging from about 165 to 250 microns, and a second proportion having an average particle size of about 75 microns, in a ratio of about 3:1 to about 1:1, about 15 to 25% activator, and the balance about 20 to about 40% common additives for viscosity, color and the like.

Preferred urethane based coatings for use with a conductive primer according to the invention include, by weight based on the weight of the composition, about 10 to about 30% reactive polyester polyol, about 5 to about 10% caprolactone polyol, about 10 to about 25% ferrosilicon particles as described above for the preferred epoxy systems, about 20 to about 30% isocyanate, and about 20 to 40% miscellaneous additives for adjusting viscosity, color, air release and the like. As noted, the use of urethanes is typically limited to thinner coatings because it does not readily form thick films having suitable mechanical properties.

As described above, the ferroalloy containing coatings according to the invention can be prepared as a stand alone coatings which do not need a conductive primer. In this embodiment, the coating is doped with the noted secondary conductive fillers to a point where the coating exhibits point-to-point conductivity without a primer. A preferred secondary filler for this purpose is antimony-tin-oxide, available from EM Industries as EM 054954. The amount of secondary conductive filler will of course very depending on the filler used and the composition of the coating. As in the primer based coatings, the stand alone composition does not contain enough ferrosilicon to render it point-to-point conductive. Typically, the ferrosilicon comprises only about 5 to about 15% by weight of a stand alone composition. Similarly, the ferrosilicon is preferably present in two different particle sizes as hereinbefore described.

An epoxy based stand alone coating according to this embodiment will preferably comprise, by weight based on the weight of the composition, from about 10 to about 40% epoxy resin, about 5 to about 15% ferrosilicon comprised of a first and second proportions, the first proportion having a larger average particle size than second, antimony-tin-oxide secondary conductive filler in an amount of from about 5 to about 15%, the activator comprises from about 10 to about 20%, and the balance of the composition, about 20 to 50%, may be comprised of ordinary additives for thixotropy, viscosity adjustment and the like as would be known in the art.

Especially preferred epoxy based stand alone coatings according to the invention will include, by weight based on the weight of the composition, about 20 to about 40% epoxy, about 5 to about 15% ferrosilicon comprised of a first proportion of particles having an average particle size ranging from about 165% to 250 microns, and a second proportion having an average particle size of about 75 microns, in a ratio of about 3:1 to about 1:1, about 5 to about 15% antimony-tin-oxide, about 10 to 20% activator, and the balance about 20 to about 40% common additives for viscosity, color and the like. As noted, other particle sizes and relative amounts may be selected to obtain varying results and may also vary with the thickness of the coating.

The troweled systems, having wet film thicknesses in excess of about 90 mils, are epoxy based. Preferred troweled systems according to the invention will typically comprise, by weight based on the weight of the composition, about 5 to about 20% epoxy, about 35 to about 70% silica sand, about 20 to about 45% ferrosilicon including a first portion of particles having a particles size of 16×50 mesh, and a second portion having a particle size of 60×90 mesh in a ratio of 2.2:1, about 5 to 10% activator, and the balance about 1 to 5% additives for adjusting viscosity and the like.

The ferroalloy containing coating layers are typically installed by pouring the mixed composition in a line onto the floor or cured conductive primer. The line of coating material is then squeegeed with a notched squeegee to achieve the desired wet film thickness up to about 90 mils. The coating is then rolled with paint rollers and spiked rollers to level the floor and remove any minute air bubbles. The coating is then allowed to cure until a person can walk on the floor, typically about 10 to 16 hours at 75° F. The troweled coatings are prepared in a different manner. The uncured resin and curing agent are packaged in separate containers. The pigments may be packaged separately or incorporated with either the uncured resin or curing agent. The glass beads, silica sand and ferrosilicon are also packaged separately. To install the system, the resin and curing agent are poured into a 3 cubic foot mortar mixer with the mixer running. The pigment or color pack and glass beads are added next. Finally, the silica sand and ferrosilicon are added and the material mixed for about 3 minutes. The mixed materials are then poured into a wheelbarrow or georgia buggy, and subsequently poured onto the floor or cured conductive primer in a line approximately 1 foot wide and spread with a rake. The coating is then power troweled to level the floor and then allowed to cure.

The troweled coatings can be prepared as a stand alone system if doped with a suitable secondary conductive filler, such as antimony-tin-oxide, to make the coating point-to-point conductive. In some instances, it may be desirable to coat the cured troweled system, either stand alone or primer based, with one or more additional non-troweled ferroalloy containing layers to seal it, make it easier to clean, provide more consistent color and provide a more uniform gloss.

These and other embodiments and a greater understanding of the invention will be had from the following non-limiting examples.

EXAMPLE 1

A conductive primer composition according to the invention was prepared containing, by weight based on the weight of the composition, 37.2% Ciba-Geigy 6010 epoxy, 5.4% Chevron C55 Shawinigan Black 50% acetylene carbon black, 9.3% Shell Epoxide 8, 17.8% nonyl phenol from Texaco, 7.2% furfuryl alcohol from Quaker Oats, 0.1% Byk-032 air release agent from Byk Chemie, and 23.0% Ancamine 2368 curing agent (activator) from Air Products.

The composition was prepared by adding the 6010 epoxy and Epoxide 8 to a tank and blending under a Cowles Dissolver for 5 minutes. The nonyl phenol, furfuryl alcohol and Byk-032 were then added slowly over a period of 15 minutes while the dissolver was running. To complete the uncured resin composition the acetylene black conductive filler was added slowly over a 20 minute period while the dissolver continued running. It is noted that the conductive filler can alternatively be added to the activator. In this event, the activator would then be placed in a separate tank and the conductive fillers added slowly over a 20 minute period while blending.

To install the primer composition the epoxy composition is put in a container large enough to accommodate the addition of the activator. The activator and epoxy composition are then mixed for 2 to 3 minutes with a Jiffy-type mixer. The mixed conductive primer is then applied with a 3/16 inch nap paint roller at a wet film thickness of 5 to 10 mils. The primer is then allowed to cure for typically 8 to 10 hours at 75° F. until a person can walk on the floor.

EXAMPLE 2

A conductive primer composition according to the invention was prepared containing, by weight based on the weight of the composition, 33.0% Ciba-Geigy 6010 epoxy, 15.9% PC-38 graphite available from UCar, 8.3% Epoxide 8 from Shell, 15.9% nonyl phenol from Texaco, 6.4% furfuryl alcohol from Quaker Oats, 0.1% Byk-032 air release agent, and 20.4% Ancamine 2368 curing agent (activator) from Air Products.

The materials were prepared in the same manner as the preceding example except that the graphite was added slowly over 20 minutes rather than the carbon black. As with the preceding example, the graphite may be added to the activator rather than the epoxy. Coating of this composition proceeds in the manner described in the preceding example.

EXAMPLE 3

An epoxy based coating was prepared from, by weight based on the weight of the composition, 35.1% Ciba-Geigy 6010 epoxy, 4.0% Epoxide 8, 25.9% Duramet 60×90 mesh ferrosilicon, 5.1% Duramet 200 ferrosilicon, 1.4% nonyl phenol, 10.1% 45–150 μm silica flour from Central Silica Inc., 0.1% Byk-032, 15.3% Ancamine 2368 activator, and 3.0% pigments.

The 6010 epoxy and Epoxide 8 were added to a tank and blended in a Cowles Dissolver for 5 minutes. The silica flour and nonyl phenol were added and mixed for 15 minutes. The Duramet 60×90, Duramet 200 and Byk-032 were added next and blended for 15 minutes to complete the uncured resin. As with the preceding examples, the conductive filler particles can optionally be added to the activator.

To install the coating, the uncured resin is added to a container large enough to accommodate the activator. The materials are then mixed for 2 to 3 minutes with a Jiffy-type mixer. Any desired pigments are then added in the form of color packs as is known in the art. The mixed coating is then applied with a 3/16 inch nap roller to the desired wet film thickness, e.g. 10 to 90 mils. The coating is typically poured in a line onto the floor or conductive primer and then squeegeed with a notched squeegee to achieve the desired thickness. The coating is then rolled with paint rollers and spiked rollers to level the floor and remove any air bubbles. The coatings are then allowed to cure until a person can walk on the floor, typically about 10 to 16 hours at 75° F.

EXAMPLE 4

A epoxy based stand alone coating according to the invention may be prepared from 38.7% Ciba-Geigy 6010 epoxy, 4.0% Epoxide 8, 10.9% Duramet 60×90 mesh ferrosilicon, 45.1% Duramet 200 ferrosilicon, 10.4% antimony-tin-oxide, 2.4% nonyl phenol, 10.1% 45 –150 μm silica flour from Central Silica Inc., 0.1% Byk-032, 16.3% Ancamine 2368 activator, and 3.0% pigments. This coating is prepared and coated in the manner described in the preceding example, with the antimony-tin-oxide being added along with the ferrosilicon conductive filler particles.

EXAMPLE 5

An epoxy based coating was prepared containing, by weight based on the weight of the composition, 12.0% Ciba-Geigy 6010 epoxy, 24.6% Shell Epon 1001-X75 epoxy, 3.0% Epoxide 8, 12.2% xylene, 7.2% Snow-Tex 45 silica sand from U.S. Silica, 5.9% Duramet 275D Ferrosilicon, 16.0% Duramet 200 Ferrosilicon, 0.1% Byk-032, 0.3% Bentone 154 from N.L. Industries, 0.2% Anti-Terra-U, 15.5% Ancamine 2368, and 3.0% pigments.

The foregoing composition was prepared by adding the Ciba-Geigy 6010 epoxy and Epoxide 8 to a tank and blending under a Cowles Dissolver for 5 minutes. The Snow-Tex 45 and Bentone 154 were then added and mixed for 5 minutes. The 1001-X75 was added and mixed for 5 minutes. The two types of ferrosilicon, the Byk-032 and the Anti-terra-U were then added and mixed for 15 minutes. The xylene was added last and mixed for 10 minutes. If the ferrosilicon fillers were added to the activator, it would be placed in a tank and the fillers added over a period of 15 minutes while mixing as described above. The uncured epoxy composition and activator are packaged separately until installed.

EXAMPLE 6

A urethane based coating according to the invention was prepared from, by weight based on the weight of the composition, 20.4% Desmophen 651A-65 urethane polyol, 5.2% Tone 301 urethane polyol, 13.1% glycol ether PM acetate, 15.0% xylene, 1.1% CAB 318-01, 4.5% Duramet 275D ferrosilicon, 10.0% Duramet 200 ferrosilicon, 0.1% Byk-032, 0.1% Cotin 12 from Cosan, 28.5% N-3200 from Miles and 2.0% pigments.

The foregoing composition was prepared by adding the 651A-65 and Tone 301 to a tank and blending under a Cowles Dissolver for 5 minutes. The CAB 318-01 and Cotin 12 were added and mixed for 5 minutes. The two types of ferrosilicon and the Byk-032 were then added and mixed for 15 minutes. The xylene and glycol ether PM acetate were added last and mixed for 10 minutes. With this coating the conductive filler cannot be added to the isocyanate because moisture present on the fillers would cause the isocyanate to gel.

EXAMPLE 7

A stand alone epoxy based coating composition may be prepared from 12.0% Ciba-Geigy 6010 epoxy, 24.6% Epon 1001-X75, 3.0% Epoxide 8, 12.2% xylene, 7.2% Snow-Tex 45 silica sand, 4.5% Duramet 275D ferrosilicon, 10.0% Duramet 200 ferrosilicon, 7.4% antimony-tin-oxide, 0.1% Byk-032, 0.3% Bentone 154, 0.2% Anti-Terra-U, 15.5% Ancamine 2368, and 3.0% pigments. The composition may be prepared in the same manner as described above in Example 5, with the antimony-tin-oxide being added along with the ferrosilicon.

EXAMPLE 8

A stand alone epoxy based coating composition may be prepared from, by weight based on the weight of the composition, 20.4% Desmophen 651A-65 urethane polyol, 5.2% Tone 301 urethane polyol, 13.1% glycol ether PM acetate, 15.0% xylene, 1.1% CAB 318-01, 3.0% Duramet 275D ferrosilicon, 6.5% Duramet 200 ferrosilicon, 5.0% antimony-tin-oxide, 0.1% Byk-032, 0.1% Cotin 12, 28.5% N-3200 and 2.0% pigments. This composition may be prepared in the manner of Example 5 with the antimony-tin-oxide being added along with the ferrosilicon.

EXAMPLE 9

An epoxy based troweled coating according to the invention was prepared from 8.0% Ciba-Geigy 6010 epoxy, 2.0% Epoxide 8, 49.2% silica sand in a 1:1 blend of 10×20 and 20×40 mesh particles, 24% Duramet 16×50 ferrosilicon, 9.0% Duramet 60×90 ferrosilicon, 5.6% Ancamine 2368 curing agent, 0.4% glass beads as a troweling aid and 0.4% pigments.

The uncured resin and curing agent are packaged in separate containers. The pigments can be packaged separately or with the resin or curing agent. The glass beads, silica sand and ferrosilicon are packaged in separate containers. To install the coating, the resin and curing agent are poured into a 3 cubic foot mortar mixer with the mixer running. The pigments or color pack and glass beads are added next, followed by the silica sand and ferrosilicon. The materials are then mixed for 3 minutes. The coating composition is then transferred to a wheelbarrow or georgia buggy for dispersion onto the floor. The composition is poured onto the floor or conductive primer in a line approximately 1 foot wide and spread with a rake. The coating is then power troweled to level the floor and allowed to cure.

Comparative Example 1

An epoxy based troweled coating was prepared from 7.7% Ciba-Geigy 6010 epoxy, 2.0% Epoxide 8, 74.0% silica sand in a 1:1 blend of 10×20 and 20×40 mesh particles, 10% Duramet 16×50 ferrosilicon, 5.5% Ancamine 2368 curing agent, 0.4% glass beads and 0.4% pigments.

This system was prepared and coated in the manner of the preceding example. The system was insulative over a conductive primer using the ESD S7.1 test.

Comparative Example 2

An epoxy based troweled coating was prepared from 7.7% Ciba-Geigy 6010 epoxy, 2.0% Shell Epoxide 8, 54.0% silica sand in a 1:1 blend of 10×20 and 20×40 mesh particles, 30% 16×50 Duramet ferrosilicon, 5.5% Ancamine 2368 curing agent, 0.4% glass beads available from Potters as a troweling aid and 0.4% pigments.

This system was prepared and coated in the manner of the preceding example. The system was insulative over a conductive primer using the ESD S7.1 test.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. An electrically conductive coating on a substrate comprising a ferroalloy containing layer including particles of ferroalloy interspersed with a resinous binder, said ferroalloy particles having an average particle size greater than about 20 micrometers and being present in an amount that produces a point-to-point resistance in said ferroalloy containing layer in excess of about $1 \times 10^9$ ohms, said ferroalloy containing layer having a thickness of at least about 90 mils, said ferroalloy containing layer further including a portion of secondary conductive filler particles, said secondary filler particles being a different material than said ferroalloy particles, and a n electrically conductive layer disposed directly under said ferroalloy containing layer.

2. A coating according to claim 1 wherein said ferroalloy is ferrosilicon.

3. A coating according to claim 1 or 2 wherein said ferroalloy is present in first and second portions, said first portion of ferroalloy having an average particle size that is greater than said second portion of ferroalloy.

4. A coating according to claim 3 wherein said second portion of particles has an average particle size of from about 20 to about 300 microns.

5. An electrically conductive coating on a substrate comprising:

a) a ferroalloy containing layer including first and second portions of ferroalloy particles interspersed with a resinous binder, said ferroalloy containing layer having a thickness of at least about 90 mils, said first portion of ferroalloy having an average particle size that is greater than said second portion of ferroalloy and at least one of:
i) an electrically conductive layer disposed directly under said ferroalloy containing layer; and
ii) a portion of secondary electrically conductive filler particles present in said ferroalloy containing layer in an amount sufficient to render said ferroalloy containing layer point-to-point conductive, said secondary filler particles being a different material than said ferroalloy.

6. A coating according to claim 5 wherein said ferroalloy is ferrosilicon and said second portion of particles has an average particle size of from about 20 to about 300 micrometers.

7. A coating according to claim 5 including an electrically conductive layer disposed directly under said ferroalloy containing layer.

8. A coating according to claim 5 or 8 wherein said ferroalloy particles are present in an amount that, by itself in the absence of any secondary filler particles in said ferroalloy containing layer, produces a point-to-point resistance in said ferroalloy containing layer in excess of about $1 \times 10^9$ ohms and said coating includes an electrically conductive layer disposed directly under said ferroalloy containing layer.

9. A coating according to claim 5 or 8 wherein said ferroalloy particles are present in an amount that, by itself in the absence of any secondary filler particles in said ferroalloy containing layer, produces a point-to-point resistance in said ferroalloy containing layer in excess of about $1 \times 10^9$ ohms and said ferroalloy containing layer includes a portion of secondary conductive filler particles in an amount sufficient to render said ferroalloy containing layer point-to-point conductive, said secondary filler particles being a different material than said ferroalloy particles.

10. A coating according to claim 5, 6 or 7 wherein the ratio of said first portion of particles to said second portion of particles is from about 1:1 to about 3:1.

11. The coating according to claim 5 wherein said first portion of ferroalloy particles has an average particle size of from about 150 to about 425 micrometers.

12. The coating according to claim 5 wherein said first portion of ferroalloy particles has an average particle size ranging from about 297 micrometers to about 1190 micrometers.

13. The coating according to claim 5 wherein said second portion of ferroalloy particles has an average particle size ranging from about 165 micrometers to about 250 micrometers.

* * * * *